(12) United States Patent
Welchko et al.

(10) Patent No.: US 7,411,801 B2
(45) Date of Patent: Aug. 12, 2008

(54) METHOD AND APPARATUS FOR CONTROLLING VOLTAGE LINEARITY OF VOLTAGE SOURCE INVERTERS

(75) Inventors: Brian Welchko, Torrance, CA (US); Steven E. Schulz, Torrance, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 334 days.

(21) Appl. No.: 11/300,249

(22) Filed: Dec. 14, 2005

(65) Prior Publication Data
US 2007/0133242 A1 Jun. 14, 2007

(51) Int. Cl.
*H02M 7/537* (2006.01)

(52) U.S. Cl. .................. 363/131; 318/801

(58) Field of Classification Search ............. 363/40, 363/41, 42, 43, 97, 98, 132; 318/801
See application file for complete search history.

(56) References Cited

U.S. PATENT DOCUMENTS 6,075,350 A * 6/2000 Peng .................. 363/40
6,534,949 B2 * 3/2003 Szczesny et al. ......... 363/133

* cited by examiner

*Primary Examiner*—Jessica Han

(57) ABSTRACT

Methods and apparatus are provided for modifying a pulse width modulation signal controlling a voltage source inverter. The method comprises the steps of determining a duty cycle of the signal, clipping the duty cycle when a modulation index is greater than a minimum modulation index and less than a maximum modulation index, clipping the duty cycle when the modulation index is greater than or equal to the maximum modulation index, and transmitting the duty cycle to the voltage source inverter. The minimum modulation index indicates a distortion range.

20 Claims, 3 Drawing Sheets

METHOD AND APPARATUS FOR CONTROLLING VOLTAGE LINEARITY OF VOLTAGE SOURCE INVERTERS

TECHNICAL FIELD

The present invention generally relates to voltage source inverters, and more particularly relates to apparatus and methods for controlling the output voltage component of a voltage source inverter.

BACKGROUND OF THE INVENTION

A variety of controllers are used to control vehicle systems. One example of a vehicle-based controller is an inverter controller. The inverter controller is used to control the vehicle traction drive and numerous other vehicle systems. When using the inverter controller in vehicle systems, it is desirable to minimize current and torque pulsations, particularly at high speeds.

Discontinuous Pulse Width Modulation (DPWM) methods are commonly employed in inverter controllers to control the fundamental output voltage component of three-phase voltage source inverters. These three-phase voltage source inverters may in turn be used to control the phase currents of three-phase Alternating Current (AC) motors. DPWM methods reduce inverter losses in comparison to continuous Pulse Width Modulation (PWM) methods, such as sinusoidal or space vector modulation.

In general, a PWM signal has a modulation index that defines the amplitude of the fundamental output voltage component produced by the three-phase voltage source inverter. This modulation index is often defined in terms of a maximum fundamental output voltage that can be produced by the three-phase voltage source inverter. The modulation index ($M_i$) is given as:

$$M_i = \frac{\frac{V_1^*}{2}}{\frac{2}{\pi} V_{dc}}$$

where $V_{dc}$ is the Direct Current (DC) voltage provided to the three-phase voltage source inverter and $V_1^*$ is a commanded amplitude of the fundamental output voltage component.

Most PWM methods used with voltage source inverters are susceptible to voltage distortion due to practical limitations of the voltage source inverter, such as inverter lockout time and minimum pulse width constraints. These practical limitations are typically non-linear effects that manifest as finite and controllable minimum and maximum pulse widths. Either inverter switch, for a phase leg, of the voltage source inverter can be indefinitely held "ON" to create discrete values of pulse widths with duty cycles of zero and one, respectively. During some operating conditions, typically at high values of $M_i$, the commanded duty cycles for a particular phase leg have a pulse width between the minimum and maximum achievable pulse widths and the corresponding discrete values of zero and one. The non-linear effects produce unachievable regions that occur for each phase of the voltage source inverter (e.g., four times per fundamental cycle).

In the unachievable regions, the inverter control is typically set to clamp the duty cycles at either the maximum pulse width or to one of the voltage rails in a continuously "ON" condition. Analogously, the inverter control may also be set to clamp the duty cycle at either the minimum pulse width or to a lower voltage rail. Either of these conventional settings alters the output fundamental voltage component produced by the voltage source inverter, and the input-output voltage relationship of the modulation index ($M_i$) becomes non-linear.

Accordingly, it is desirable to provide a method of controlling a fundamental output voltage component of voltage source inverters that maintains an input-output voltage linearity relationship. Additionally, it is desirable to provide a controller that controls a fundamental output voltage component of a voltage source inverter while maintaining an input-output voltage linearity relationship. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods and apparatus are provided for controlling a voltage source inverter. In an exemplary embodiment, a method is provided for modifying a signal controlling a voltage source inverter. The method comprises the steps of determining a duty cycle limit of the signal, limiting the signal to the duty cycle limit when a modulation index ($M_i$) is greater than a minimum modulation index to produce an output signal, and transmitting the output signal to the voltage source inverter. The minimum modulation index indicates a distortion range.

In another exemplary embodiment, a method is provided for modifying a signal controlling a voltage source inverter comprising the steps of determining a duty cycle for a phase-leg of the signal, clamping the signal at a first potential when the duty cycle is between a first duty cycle limit and a second duty cycle limit indicating a distortion range, clamping the signal at a second potential when the duty cycle is greater than or equal to the second duty cycle limit, clamping the signal at a third potential when the duty cycle is between a third duty cycle and a fourth duty cycle indicating the distortion range, and clamping the signal at a fourth potential when the duty cycle is less than or equal to the fourth duty cycle.

A voltage source inverter for controlling an inverter load is provided comprising a controller and a switch network having a first input coupled to the controller and having a second input configured to couple to a reference potential. The controller is configured to determine a duty cycle of a first signal, limit the duty cycle at a first duty cycle limit when a modulation index is greater than a minimum modulation index to produce an output duty cycle. The minimum modulation index indicates a distortion range. The switch network is configured to convert the reference potential to a voltage based on the first signal and transmit a second signal having the voltage.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
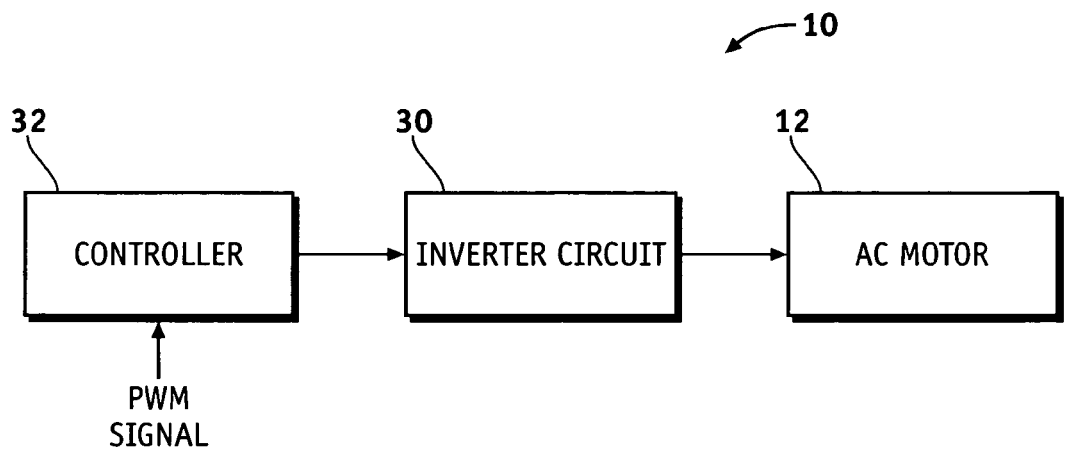
FIG. 1 is a voltage source inverter system in accordance with an exemplary embodiment of the present invention.

Referring to FIG. 1, a voltage source inverter system 10 is shown in accordance with an exemplary embodiment of the present invention. The voltage source inverter system 10 comprises a controller 32, an inverter circuit 30 coupled to the controller 32, and an Alternating Current (AC) motor 12 coupled to the inverter circuit 30. Generally, the controller 32 has an input configured to receive an input PWM signal having a modulation index ($M_i$) and modifies the input PWM signal, based on the modulation index ($M_i$), to produce an output signal that maintains the linearity of the input-output voltage relationship of the voltage source inverter system 10. The inverter circuit 30 receives the output signal from the controller 32 and converts the output signal to a modulated voltage waveform for operating the ac motor 12. The AC motor 12 may be any conventional AC motor commonly used in automotive vehicles in a number of vehicle systems or subsystems (e.g., a traction drive control system).

Figure 2:
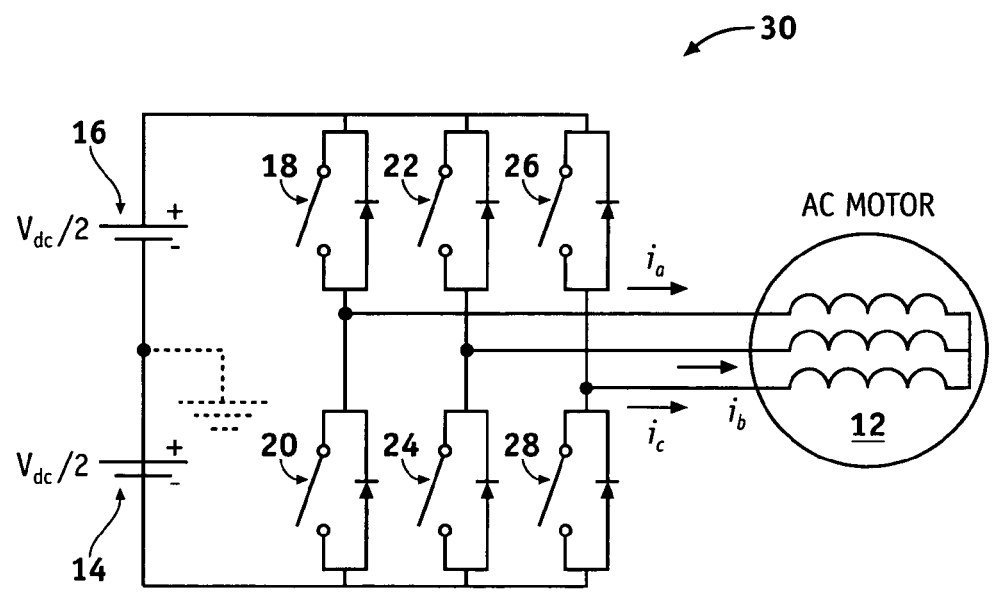
FIG. 2 is the inverter circuit shown in FIG. 1 in greater detail.

FIG. 2 is the inverter circuit 30 of FIG. 1 in greater detail. The inverter circuit 30 is a three-phase-circuit coupled to the AC motor 12. More specifically, the inverter circuit 30 comprises voltage sources (14,16) and a switch network having a first input coupled to the voltage sources (14,16) and an output configured to couple to the AC motor 12.

The switch network comprises three pairs of series switches with antiparallel diodes (i.e., antiparallel to each switch) corresponding to each of the phases. Each of the pairs of series switches comprises a first switch (18,22,26) having a first terminal coupled to a positive electrode of the voltage source (14,16) and a second switch (20,24,28) having a second terminal coupled to a negative electrode of the voltage source (14,16) and having a first terminal coupled to a second terminal of the first switch (18,22,26), respectively.

Figure 3:
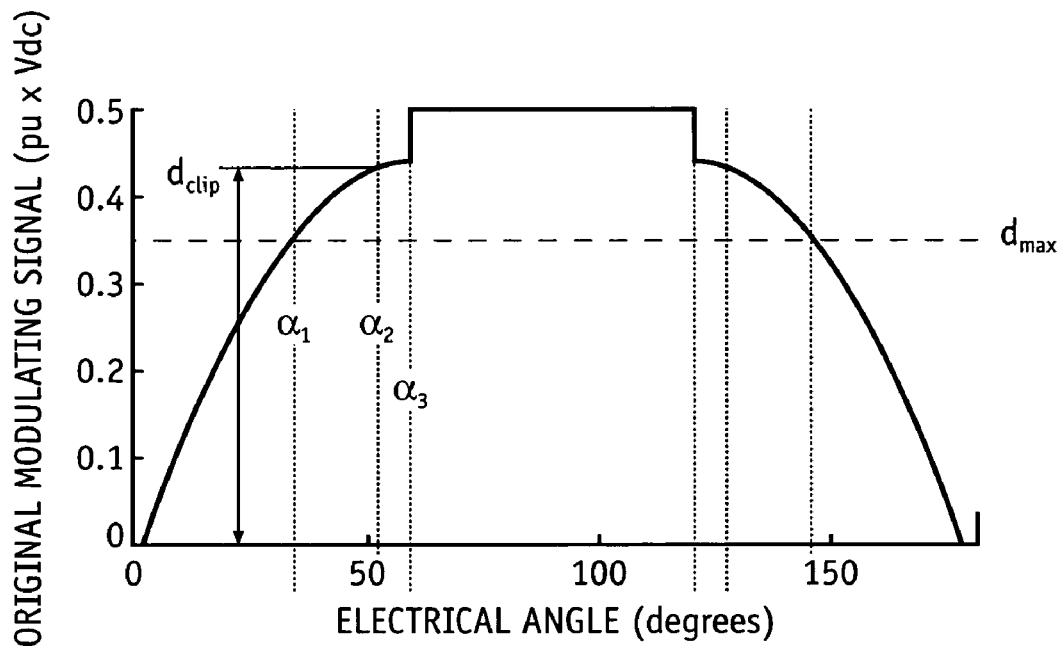
FIG. 3 is an input modulation waveform useful in explaining the operation of the voltage source inverter 10 shown in FIG. 1.

FIG. 3 is an input modulation waveform useful in explaining the operation of the voltage source inverter 10 shown in FIG. 1. For simplicity of explanation, the input modulation waveform is shown and described with respect to the duty cycles associated with the positive half wave of an input modulation signal (e.g., a PWM signal) provided to the voltage source inverter. The input modulation waveform also includes a substantially symmetrical negative half wave for each fundamental cycle of the input modulation signal. Additionally, the positive half wave of the input modulation signal corresponds to a single phase leg of the voltage source inverter. Once the modulation index ($M_i$) increases beyond a value where a commanded duty cycle (d) is greater than a maximum duty cycle limit ($d_{max}$) or less than a minimum duty cycle limit ($d_{min}$), the input-output voltage relationship of the voltage source inverter may become non-linear.

Figure 4:
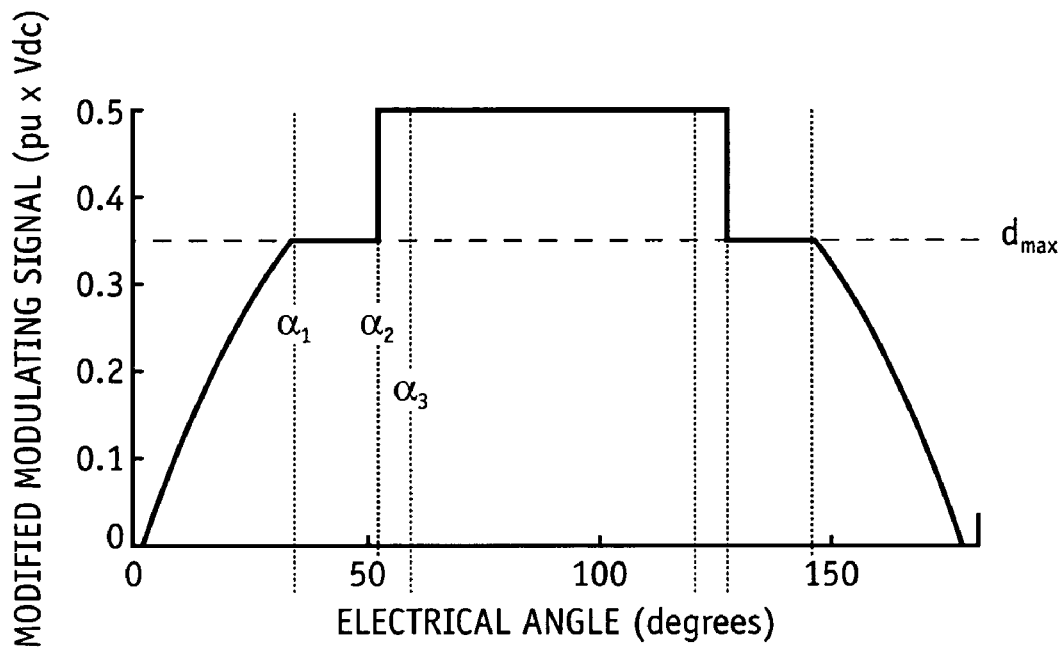
FIG. 4 is an output modulation waveform useful in explaining the operation of the voltage source inverter 10 shown in FIG. 1.

FIG. 4 is an output modulation waveform useful in explaining the operation of the voltage source inverter 10 shown in FIG. 1. For simplicity of explanation, the output modulation waveform is shown and described with respect to the duty cycles associated with the positive half wave of a modified modulation signal (e.g., a modified PWM signal) provided to the voltage source inverter. To substantially preserve the input-output voltage linearity of the fundamental component of the voltage source inverter, the input modulation waveform shown in FIG. 3 is limited to the maximum duty cycle limit ($d_{max}$) between first and second phase angles (e.g., $\alpha_1$ and $\alpha_2$) of the first positive half of the input modulation waveform (e.g., between about 0° and about 90°). Once the electrical phase angle of the input modulation waveform has reached the second phase angle ($\alpha_2$), the duty cycle is limited to a reference potential, such as an upper voltage rail. For a second positive half (e.g., between about 90° and about 180°), the input modulation waveform shown in FIG. 3 is similarly limited to $d_{max}$ at first and second phase angles of the second positive half that are symmetrical about 90° to the first and second phase angles ($\alpha_1$, $\alpha_2$) of the first half of the positive half of the input modulation waveform. The result of this process is the output modulation waveform shown in FIG. 4. Additionally, this process of limiting the duty cycle in the first and second halves of the positive half wave of the input modulation signal is repeated for the first and second halves of the negative half wave of the input modulation signal.

A minimum modulation index ($M_{i\_min}$) at which this compensation occurs (e.g., modification of the duty cycles of the input modulation waveform) is preferably derived from:

$$M_{i\_min} = \frac{d_{max} + 0.5}{\sqrt{3}\,k},$$

where $d_{max}$ is referenced to ±0.5, as shown in FIGS. 3 and 4, and the factor k is given as:

$$k = \frac{2V_{dc}}{\pi}.$$

An over-modulation range corresponding to a maximum modulation index ($M_{i\_max}$) occurs at:

$$M_{i\_max} = \frac{\pi}{2\sqrt{3}} \approx 0.907.$$

The minimum modulation index ($M_{i\_min}$) and the maximum modulation index ($M_{i\_max}$) establish a compensation range (e.g., $M_{i\_min} < M_i < M_{i\_max}$) for possible distortion to the input-output voltage relationship of the voltage source inverter.

When the modulation index ($M_i$) is in the distortion range (e.g., $M_{i\_min} < M_i < M_{i\_max}$), the first phase angle ($\alpha_1$) is a function of both the modulation index ($M_i$) and the maximum pulse width and is found by solving $$d_{max} = M_i k \sin(\alpha_1) - \frac{1}{2} - M_i k \sin\!\left(\alpha_i - \frac{2\pi}{\sqrt{3}}\right).$$

Once the first phase angle ($\alpha_1$) is known, the second phase angle ($\alpha_2$), which is also a function of both the modulation index ($M_i$) and the maximum pulse width, is found by solving $$M_ik = \frac{1}{\pi^2}\left[2M_ik\pi\alpha_1 + 2M_i\alpha_1 + \sqrt{3}\,M_i - 2\pi\right] +$$
$$\frac{1}{\pi^2}\left[2\pi\cos(\alpha_1) - M_ik\pi\sin(2\alpha_1) - 2M_i\sin\left(2\alpha_1 + \frac{\pi}{3}\right)\right] +$$
$$\frac{4}{\pi}d_{max}[\cos(\alpha_1) - \cos(\alpha_2)] + \frac{2}{\pi}\cos(\alpha_2)$$

The value of $d_{clip}$ varies with the first and second phase angles ($\alpha_1$, $\alpha_2$) that in turn vary with the commanded modulation index ($M_i$) and the maximum pulse width. In an exemplary embodiment, the value of $d_{clip}$ may be pre-determined and stored (e.g., in a look-up table) for access by the controller 32 (FIG. 1) to determine duty cycles normally provided to the voltage source inverter 10 (FIG. 1). Using this pre-determined value of $d_{clip}$ for the commanded modulation index ($M_i$), the actual pulses transmitted to the switch network may be modified by the controller 32 (FIG. 1).

When the commanded modulation index ($M_i$) is greater than the maximum modulation index ($M_{i\_max}$), the value of $d_{clip}$ can be approximated as:

$$d_{clip} = \frac{1}{2} - \frac{1}{2}\left(\frac{1}{2} - d_{max}\right).$$

Figure 5:
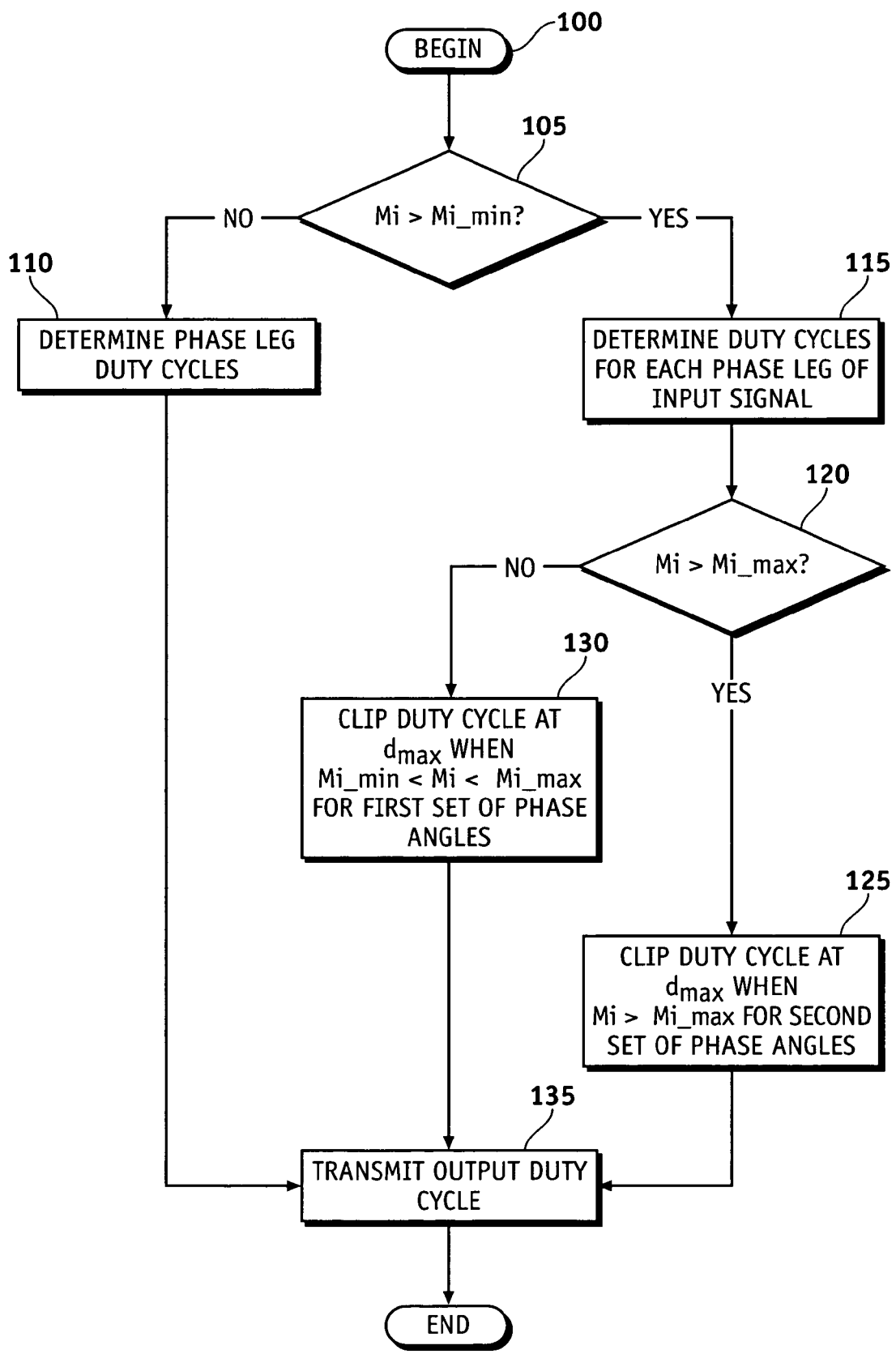
FIG. 5 is a method of controlling a modulation signal for a voltage source inverter in accordance with an exemplary embodiment of the present invention.

Referring to FIGS. 1 and 5, a method of controlling a modulation signal for a voltage source inverter is shown in accordance with an exemplary embodiment of the present invention. The controller 32 determines whether the commanded modulation index ($M_i$) is greater than the minimum modulation index ($M_{i\_min}$) at step 105. As previously mentioned, the minimum modulation index ($M_{i\_min}$) indicates a distortion range corresponding to the maximum duty cycle limit ($d_{max}$). In the event that the commanded modulation index ($M_i$) is less than the minimum modulation index ($M_{i\_min}$), the controller 32 determines the duty cycles for each phase leg of input modulation signal at step 110. For example, for a three-phase voltage source inverter, the controller 32 determines the duty cycles of the phase legs for each of the three phases. After the duty cycles are determined at step 110, the controller 32 transmits an output duty cycle to the inverter circuit 30 at step 135.

In the event that the commanded modulation index ($M_i$) is greater than the minimum modulation index ($M_{i\_min}$), the controller 32 determines the duty cycles for each phase leg of the input modulation signal at step 115. After the duty cycles are determined at step 115, the controller 32 determines whether the commanded modulation index ($M_i$) is greater than the maximum modulation index ($M_{i\_max}$) at step 120. In the event that the commanded modulation index ($M_i$) is less than the maximum modulation index ($M_{i\_max}$), the controller 32 limits the duty cycle to the maximum duty cycle limit $d_{max}$ with a first set of phase angles ($\alpha_1$, $\alpha_2$) when the $M_{i\_min} < M_i < M_{i\_max}$ at step 130. In an exemplary embodiment, the controller 32 clamps the input modulation signal at a first potential when the duty cycle reaches the first phase angle ($\alpha_1$), indicating the maximum duty cycle limit ($d_{max}$), and clamps the signal at a second potential when the duty cycle reaches a second phase angle ($\alpha_2$). As previously mentioned hereinabove, the minimum modulation index ($M_{i\_min}$) is preferably derived from:

$$M_{i\_min} = \frac{d_{max} + 0.5}{\sqrt{3}\,k},$$

and the factor k is given as:

$$k = \frac{2V_{dc}}{\pi}.$$

In an exemplary embodiment, the over-modulation range corresponding to the maximum modulation index ($M_{i\_max}$) occurs at:

$$M_{i\_max} = \frac{\pi}{2\sqrt{3}} \approx 0.907.$$

The controller 32 limits the duty cycle to the maximum duty cycle limit $d_{max}$ with a second set of phase angles ($\alpha_1$, $\alpha_2$), different from the first set of phase angles, when $M_i > M_{i\_max}$ at step 125. For example, the controller 32 clamps the input modulation signal at a first potential when the duty cycle reaches the first phase angle ($\alpha_1$), indicating the maximum duty cycle limit ($d_{max}$), and clamps the signal at a second potential when the duty cycle reaches a second phase angle ($\alpha_2$) when $M_i > M_{i\_max}$. In an exemplary embodiment, the second duty cycle limit ($d_{clip}$) is determined by:

$$d_{clip} = \frac{1}{2} - \frac{1}{2}\left(\frac{1}{2} - d_{max}\right).$$

After the duty cycle is limited at the second duty cycle limit at step 125, the controller 32 transmits the output duty cycle as associated with the modified signal at step 130.

Although the exemplary embodiment of the method is shown and described with reference to a DPWM signal method, one that is switching loss optimized for a unity power factor load (e.g., DPWM1), the equations representing the various duty cycles may be modified for other DPWM signal methods.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of modifying a signal controlling a voltage source inverter, the method comprising the steps of:
    determining a duty cycle limit ($d_{max}$) based on the signal;
    limiting the signal to the duty cycle limit when a modulation index ($M_i$) is greater than a minimum modulation index ($M_{i\_min}$) to produce an output signal when a duty cycle of the signal reaches a first phase angle ($\alpha_1$) determined as a function of the modulation index ($M_i$); and transmitting the output signal to the voltage source inverter.

2. A method according to claim 1, wherein said limiting step comprises limiting the signal to the duty cycle limit when the modulation index (Mi) is greater than the minimum modulation index (Mi_min) and less than a maximum modulation index (Mi_max), the minimum modulation index (Mi_min) indicating a distortion range.

3. A method according to claim 1 further comprising the step of limiting the signal to a second duty cycle limit ($d_{clip}$) when the modulation index (Mi) is greater than the maximum modulation index (Mi_max), the maximum modulation index (Mi_max) indicating an overmodulation range.

4. A method according to claim 1, wherein said step of limiting the signal at the duty cycle limit ($d_{max}$) comprises clamping the signal at a first potential when a duty cycle of the signal reaches the first phase angle ($\alpha_1$) indicating a maximum duty cycle.

5. A method according to claim 1, wherein the first phase angle ($\alpha_1$) is based on $$d_{max} = M_i k \sin(\alpha_1) - \frac{1}{2} - M_i k \sin\left(\alpha_i - \frac{2\pi}{\sqrt{3}}\right),$$

wherein $\alpha_1$ is a phase angle corresponding to the modulation index (Mi) and k is a factor $$k = \frac{2V_{dc}}{\pi},$$

and wherein Vdc is a supply potential to the voltage source inverter.

6. A method according to claim 1, wherein said step of limiting the signal at the duty cycle limit comprises:

clamping the signal at a first potential when a duty cycle of the signal reaches the first phase angle ($\alpha_1$) indicating a maximum duty cycle ($d_{max}$); and clamping the signal at a second potential when the duty cycle of the signal reaches a second phase angle ($\alpha_2$).

7. A method according to claim 6, wherein $$M_i k = \frac{1}{\pi^2}\left[2M_i k \pi \alpha_1 + 2M_i \alpha_1 + \sqrt{3}\, M_i - 2\pi\right] + \frac{1}{\pi^2}\left[2\pi\cos(\alpha_1) - M_i k\pi \sin(2\alpha_1) - 2M_i \sin\left(2\alpha_1 + \frac{\pi}{3}\right)\right] + \frac{4}{\pi}d_{max}[\cos(\alpha_1) - \cos(\alpha_2)] + \frac{2}{\pi}\cos(\alpha_2)$$

wherein k is a factor $$k = \frac{2V_{dc}}{\pi},$$

and wherein Vdc is a supply potential to the voltage source inverter.

8. A method according to claim 1, wherein the duty cycle limit ($d_{max}$) indicates a maximum duty cycle, wherein $$M_{i\_min} = \frac{d_{max} + 0.5}{\sqrt{3}\, k},$$

wherein k is a factor $$k = \frac{2V_{dc}}{\pi},$$

and wherein Vdc is a supply potential to the voltage source inverter.

9. A method of modifying a signal controlling a voltage source inverter, the method comprising the steps of:

determining a duty cycle for a phase-leg of the signal;

clamping the signal at a first potential when the duty cycle is between a first duty cycle limit ($d_{max}$) and a second duty cycle limit ($d_{clip}$) indicating a distortion range when the duty cycle reaches a first phase angle ($\alpha_1$) determined as a function of the modulation index ($M_i$);

clamping the signal at a second potential when the duty cycle ≧ the second duty cycle limit ($d_{clip}$);

clamping the signal at a third potential when the duty cycle is between a third duty cycle limit ($d_{min}$) and a fourth duty cycle limit indicating the distortion range; and clamping the signal at a fourth potential when the duty cycle ≦ the fourth duty cycle limit.

10. A method according to claim 9, wherein said step of clamping the signal at a first potential comprises determining a first phase angle ($\alpha_1$) corresponding to the first duty cycle limit ($d_{max}$).

11. A method according to claim 9, wherein $$d_{max} = M_i k \sin(\alpha_1) - \frac{1}{2} - M_i k \sin\left(\alpha_i - \frac{2\pi}{\sqrt{3}}\right),$$

wherein $M_i$ is a modulation index of the signal and $\alpha_1$ is a phase angle corresponding to the modulation index ($M_i$).

12. A method according to claim 11, wherein said step of clamping the signal at a first potential further comprises determining a second phase angle ($\alpha_2$) corresponding to the second duty cycle limit ($d_{clip}$).

13. A method according to claim 12, wherein $$M_i k = \frac{1}{\pi^2}\left[2M_i k \pi \alpha_1 + 2M_i \alpha_1 + \sqrt{3}\, M_i - 2\pi\right] + \frac{1}{\pi^2}\left[2\pi\cos(\alpha_1) - M_i k\pi \sin(2\alpha_1) - 2M_i \sin\left(2\alpha_1 + \frac{\pi}{3}\right)\right] + \frac{4}{\pi}d_{max}[\cos(\alpha_1) - \cos(\alpha_2)] + \frac{2}{\pi}\cos(\alpha_2)$$

wherein k is a factor $$k = \frac{2V_{dc}}{\pi},$$

and wherein Vdc is a supply potential to the voltage source inverter.

14. A method according to claim 10 further comprising the step of determining third and fourth phase angles prior to said step of clamping the signal at a third potential, the third phase angle corresponding to the third duty cycle limit ($d_{min}$), the fourth phase angle corresponding to the fourth duty cycle limit.

15. A method according to claim 10, wherein the signal has a modulation index ($M_i$) greater than a minimum modulation index ($M_{i\_min}$) and less than a maximum modulation index ($M_{i\_max}$); and wherein said step of clamping the signal at a first potential comprises determining first and second phase angles based on the modulation index ($M_i$), the first phase angle corresponding to the first duty cycle limit ($d_{max}$), the second phase angle corresponding to the second duty cycle limit ($d_{clip}$).

16. A voltage source inverter comprising:
   a controller configured to:
      receive a first signal having a duty cycle; and
      limit said duty cycle at a first duty cycle limit ($d_{max}$) when a modulation index ($M_i$) is greater than a minimum modulation index ($M_{i\_min}$), said minimum modulation index ($M_{i\_min}$) indicating a distortion range, wherein the duty cycle of the first signal is limited when it reaches a first phase angle($\alpha_1$) determined as a function of the modulation index ($M_i$); and
   a switch network having a first input coupled to said controller and having a second input configured to couple to a reference potential ($V_{dc}$), said switch network configured to:
      convert said reference potential ($V_{dc}$) to a voltage based on said first signal; and
      transmit a second signal having said voltage.

17. A voltage source inverter according to claim 16, wherein said controller is further configured to:
   clamp said first signal at a first potential when said duty cycle reaches the first phase angle ($\alpha_1$) indicating the first duty cycle limit ($d_{max}$); and
   clamp said first signal at a second potential when said duty cycle reaches a second phase angle ($\alpha_2$).

18. A voltage source inverter according to claim 17, wherein $$M_{i\_min} = \frac{d_{max} + 0.5}{\sqrt{3}\,k},$$

wherein k is a factor $$k = \frac{2V_{dc}}{\pi}.$$

19. A method according to claim 17, wherein $$d_{max} = M_i k \sin(\alpha_1) - \frac{1}{2} - M_i k \sin\left(\alpha_i - \frac{2\pi}{\sqrt{3}}\right),$$

wherein k is a factor $$k = \frac{2V_{dc}}{\pi}.$$

20. A voltage source inverter according to claim 16, wherein said controller is further configured to:
   clamp said first signal at a first potential when $M_{i\_min} < M_i < M_{i\_max}$, wherein $M_{i\_max}$ is a maximum modulation index indicating an overmodulation region; and
   clamp said first signal at a second potential when $M_i \geq M_{i\_max}$.

* * * * *